Figure 1:
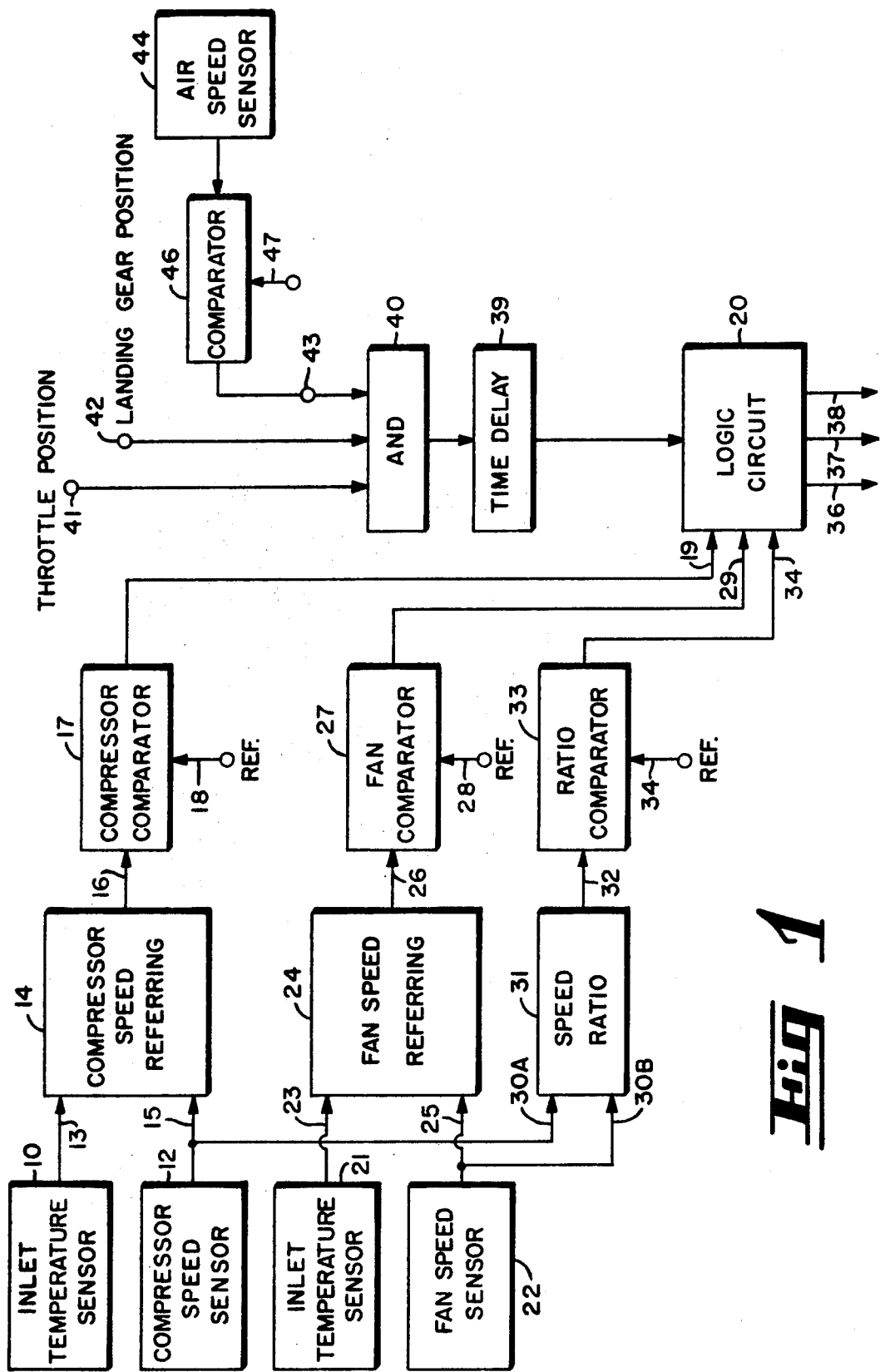

United States Patent [19]
Hohenberg

[11] 3,736,796
[45] June 5, 1973

[54] FAN ENGINE THRUST MONITOR

[75] Inventor: Rudolph Hohenberg, Trumbull, Conn.

[73] Assignee: Avco Corporation, Stratford, Conn.

[22] Filed: Mar. 27, 1972

[21] Appl. No.: 238,243

[52] U.S. Cl. ............73/178 T, 340/27 NA, 73/117.3, 60/39.09 R
[51] Int. Cl. .............................................G01m 15/00
[58] Field of Search ......................340/27 R, 27 NA; 73/117.3, 117.4, 178 R, 178 H, 178 T; 60/39.28, 39.14, 39.09 R

[56] References Cited

UNITED STATES PATENTS 3,338,050 8/1967 Ferrel et al. .........................73/178 R
3,678,742 7/1972 Westcott et al. .....................73/117.3

Primary Examiner—Kathleen H. Claffy
Assistant Examiner—Thomas L. Kundert
Attorney—Charles M. Hogan et al.

[57] ABSTRACT

A warning signal is generated if a high bypass ratio fan-type gas turbine engine fails to develop adequate thrust for takeoff of an aircraft. Two engine operating parameters are derived, referred compressor speed and referred fan speed. After a takeoff is initiated, a warning signal is developed under any one of three conditions: (1) if the referred compressor speed is less than a pre-established reference level; (2) if the referred fan speed is less than a pre-established reference level; and (3) if the ratio of compressor speed to fan speed is less than a pre-established reference level.

5 Claims, 2 Drawing Figures

FAN ENGINE THRUST MONITOR

BACKGROUND AND SUMMARY OF THE INVENTION

During the taking off of any aircraft it is essential that the pilot knows whether he has adequate thrust. At the present time there are no known satisfactory methods for making a direct measurement of thrust. The present invention is useful in connection with a high bypass ratio fan-type gas turbine engine and it provides a system for determining whether or not there is adequate thrust for takeoff, and for properly and promptly advising the pilot.

It is known that the referred compressor speed of the core engine is a measure of the power produced. It is also known that the referred fan speed of an engine is a measure of the conversion of the available mechanical power into thrust. In addition, it is known that the speed ratio between the compressor and the fan is a constant under takeoff conditions for a normally operating fan engine. This invention uses three comparators, a compressor speed comparator, a fan speed comparator, and a ratio comparator, each having predetermined reference points. Each of the comparators produces an output in binary form, the binary output being in one state when the input to the comparator is below the predetermined reference point, and in a second state when the input to the comparator is above the reference point. The output from each of the three comparators is applied to a logic circuit which is enabled by the simultaneous presence of three comparator outputs in one particular state, but only after the engine is in a take-off condition, as indicated simultaneously by throttle position, landing wheel position and air speed. The three comparator inputs to the logic circuit are sampled after a predetermined time delay. If all three comparators have an output indicating that the reference point has been exceeded, then conditions are proper for takeoff. On the other hand, if any of the outputs from the comparator do not indicate that the reference point has been exceeded, then there will be an indication that the takeoff attempt should be aborted, or that there is an instrument error.

THE DRAWINGS

Figure 2:
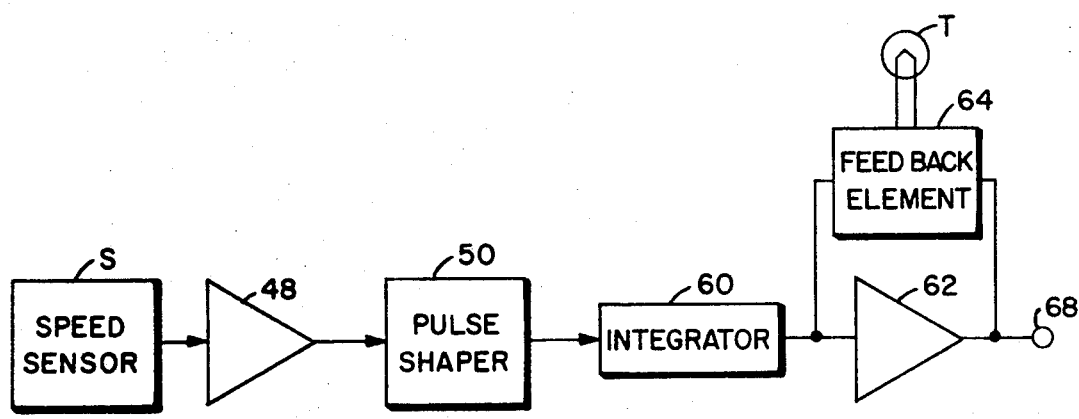

FIG. 1 is a block diagram of a fan engine thrust monitor made in accordance with this invention; and FIG. 2 is a block diagram of a system for determining referred compressor and fan speeds.

DESCRIPTION OF THE INVENTION

Referring to FIG. 1, inlet temperature is sensed by means of a resistance thermometer, thermocouple or other temperature sensor 10 positioned at the air inlet of the compressor of a gas turbine engine (not shown) while the actual compressor speed is sensed by means of a magnetic pickup 12 or other conventional speed-sensing mechanism. The temperature sensor 10 provides a voltage output which is applied to one input terminal 13 of a compressor speed referring circuit 14. The output from the compressor speed sensor 12 consists of voltage pulses which are applied to the second input terminal 15 of the referring circuit 14. The details of the referring circuit 14 are shown in FIG. 2 which will hereinafter be described in detail. The referring circuit converts the actual compressor speed to a voltage representing referred speed. The voltage output from the referring current 14 is applied to the first input terminal 16 of a comparator 17.

The second input 18 of compressor comparator 17 is provided with a predetermined reference voltage representing the referred compressor speed below which takeoff should not be attempted. The output from the comparator 17 is applied to the first input terminal 19 of a logic circuit 20.

Similarly the inlet temperature of the fan is sensed by means of a temperature sensor 21 positioned at the air inlet of the fan while the actual fan speed is sensed by means of a magnetic pickup 22 or other conventional speed-sensing mechanism. The temperature sensor 21 provides a voltage output which is applied to one terminal 23 of a fan speed referring circuit 24. The output from the compressor speed sensor 22 consists of voltage pulses which are applied to the second input terminal 25 of the referring circuit 24. The details of the referring circuit 24 are identical with the details of the compressor speed referring circuit 14 and will be described in connection with FIg. 2. The referring circuit 24 converts the actual fan speed to a voltage representing referred fan speed. The voltage output from the referring circuit 24 is applied to the first input terminal 26 of a fan comparator 27.

The second input terminal 28 of fan comparator 27 is provided with a predetermined reference voltage representing the referred fan speed below which takeoff should not be attempted. The output from the comparator 27 is applied to the second input terminal 29 of the logic circuit 20.

The output from each of the speed sensors 12 and 22 is also applied to the first and second input terminals 30A and 30B of a speed ratio circuit 31. The speed ratio circuit develops a voltage output representing the ratio of actual compressor speed to actual fan speed and is applied to the first input terminal 32 of a ratio comparator 33. The second input terminal 34 of the ratio comparator 33 is supplied with a reference voltage representing the proper ratio of compressor and fan speeds for takeoff. The output of the comparator changes state when the ratio is not proper. The output from the ratio comparator 33 is applied to the third input terminal 34 of logic circuit 20. While this comparator is not essential to performance, it provides a system check which can indicate that an instrument error exists.

The three comparators 17, 27 and 33 are each two-state or binary devices, each having a first state output, for example, zero when the input voltage is below the reference voltage, and having a second state output, for example, one, when the input voltage exceeds the reference voltage.

When the logic circuit 20 is sampled, an output signal is generated at one of its three output terminals 36, 37 or 38, depending on the states of the signals at their input terminals 19, 29 and 34. The logic circuit is sampled only after the generation of a time delayed signal from a time delay network 39. The time delayed signal is developed only after receipt of an output signal from an AND gate 40. The AND gate 40 develops an output signal only when each of its input terminals 41, 42 and 43 have been supplied with a predetermined input signal. Terminal 41 must be provided with an input signal representing throttle position for takeoff. Terminal 42 must be provided with an input signal indicating that the landing gear is in takeoff position. Input terminal 43 must be provided with an input signal indicating that the aircraft air speed is below stall.

The signal for aircraft speed is derived by means of an air speed sensor 44 which provides a voltage signal representing air speed to the first terminal 45 of a comparator 46. The second terminal 47 of the comparator 46 is provided with a reference voltage representing stall speed. The comparator 46 provides an output voltage only when the input signal at terminal 45 is less than the reference voltage applied at terminal 47.

When conditions for takeoff are met, that is when the throttle and landing gear positions are correct and when the air speed is below stall, the output from the time delay circuit provides a period to permit the engine to accelerate to takeoff speed (typically three to 5 seconds). At the end of the delay period, the logic circuit 20 is sampled and one of three logic outputs is generated: (1) go; (2) abort takeoff; (3) instrument error. The relation between comparator signal and logic circuit output after the predetermined time delay is as follows:

| | Logic output | | | | | | | |
|---|---|---|---|---|---|---|---|---|
| Comparator output signal | Go | Abort | Abort | Abort | Error | Error | Error | Error. |
| Compressor referred speed exceeds reference level | Yes | No | No | Yes | No | Yes | No | Yes. |
| Fan referred speed exceeds reference level | Yes | No | No | No | Yes | No | Yes | Yes. |
| Compressor fan speed is at reference level | Yes | No | Yes | No | Yes | Yes | No | No. |

Each of the outputs from the logic circuit 20 may be used to activate warning lights in front of the aircraft pilot or may be used to activate other aircraft alarm or monitoring systems.

The referring circuits 14 and 24 are identical and are shown in block diagram in FIG. 2. Depending on whether the circuit of FIG. 2 is being used for referring compressor of fan speed, the temperature sensor T and the speed sensor S represent the elements 10 and 12, or 21 and 22. The output from the speed sensor S is applied to a preamplifier 48 which develops a series of voltage pulses having a pulse repetition rate proportional to the speed of the compressor or fan as the case may be. The voltage pulses will be irregularly shaped and may vary in magnitude and pulse width. For that reason they are applied to a pulse shaper 50 which serves to provide a pulse having a constant width and height but whose duty cycle is a function of pulse repetition rate or speed of rotation. The reshaped pulse from the pulse shaper 50 is integrated in an integrator 60 to provide a direct voltage having a magnitude proportional to rotational speed. The output from the integrator 60 is applied to an isolation amplifier 62 which has a feedback impedance element 64 connected from its output to its input circuit. The feedback element is varied as a function of the output of the temperature sensor T.

The referring circuit serves to provide an output signal at its output terminal 68 which is proportional to:

$$K \times (\text{Actual Speed}) / \sqrt{\theta}$$

where $K$ is a proportionality constant;

Actual Speed is the rate of speed of the compressor or fan, as the case may be;

$\theta = (460 + t) / 519$ and $t =$ inlet air temperature in °F. of the compressor or fan.

I claim:

1. In a warning system for use with a high bypass ratio fan-type engine during takeoff, a pilot warning system comprising:

means for generating a first speed signal proportional to the referred compressor speed of said engine;

a first reference source having a predetermined first reference level;

means when said first speed signal is above said level for generating a first logic signal;

means for generating a second speed signal proportional to the referred fan speed of said engine;

a second reference source having a predetermined second reference level;

means when said first speed signal is above said level for generating a second logic signal;

an initially disabled logic circuit, when enabled said logic circuit developing a warning signal in the absence of either of said first and second logic signals; and means for enabling said logic circuit after a predetermined time period.

2. The invention as defined in claim 1 wherein said means for enabling said logic circuit comprises the output of a time delay circuit; and an AND gate initiated in response to the simultaneous application of a plurality of condition responsive signals, the output of said AND gate initiating the operation of said time delay circuit.

3. The invention as defined in claim 1, and means for generating a third speed signal proportional to compressor speed;

means for generating a fourth speed signal proportional to fan speed;

means for generating a third logic signal proportional to the ratio of said third speed signal to said fourth speed signal;

a third reference source having a predetermined third reference level;

means when said third logic signal deviates from said third reference level for generating a third logic signal, said third logic signal being applied to said logic circuit to modify said warning signal.

4. The invention as defined in claim 3 wherein said means for enabling said logic circuit comprises the output of a time delay circuit; and an AND gate initiated in response to the simultaneous application of a plurality of condition responsive signals, the output of said AND gate initiating the operation of said time delay circuit.

5. The invention as defined in claim 4 wherein said condition responsive signals comprise a signal responsive to throttle position, a signal responsive to landing gear position and a signal responsive to air speed.

* * * * *